(12) United States Patent
De Angelis et al.

(10) Patent No.: US 11,492,281 B2
(45) Date of Patent: Nov. 8, 2022

(54) MELTERS FOR GLASS FORMING APPARATUSES

(71) Applicant: CORNING INCORPORATED, Corning, NY (US)

(72) Inventors: Gilbert De Angelis, Lindley, NY (US); Megan Aurora DeLamielleure, Corning, NY (US); Kevin Scott Riegel, Owego, NY (US)

(73) Assignee: Corning Incorporated, Corning, NY (US)

( * ) Notice: Subject to any disclaimer, the term of this patent is extended or adjusted under 35 U.S.C. 154(b) by 160 days.

(21) Appl. No.: 16/623,621

(22) PCT Filed: Jun. 27, 2018

(86) PCT No.: PCT/US2018/039872
§ 371 (c)(1),
(2) Date: Dec. 17, 2019

(87) PCT Pub. No.: WO2019/006041
PCT Pub. Date: Jan. 3, 2019

(65) Prior Publication Data
US 2020/0115265 A1    Apr. 16, 2020

Related U.S. Application Data

(60) Provisional application No. 62/525,813, filed on Jun. 28, 2017.

(51) Int. Cl.
*C03B 5/42* (2006.01)
*C03B 3/00* (2006.01)
(Continued)

(52) U.S. Cl.
CPC .................. *C03B 5/42* (2013.01); *C03B 3/00* (2013.01); *C03B 5/04* (2013.01); *C03B 5/1672* (2013.01)

(58) Field of Classification Search
None
See application file for complete search history.

(56) References Cited

U.S. PATENT DOCUMENTS 1,891,371 A * 12/1932 Danner ................. C03B 17/064
65/53
1,932,354 A * 10/1933 Scheidt ..................... C03B 5/42
423/328.1
(Continued)

FOREIGN PATENT DOCUMENTS

CN    201737825 U    2/2011
CN    102639453 A    8/2012
(Continued)

OTHER PUBLICATIONS

Masonry arches https://ncma.org/resource/concrete-masonry-arches/ (Year: 1837).*

(Continued)

*Primary Examiner* — Jodi C Franklin

(57) ABSTRACT

In embodiments, a melter for melting glass may include an inlet wall, an outlet wall opposite the inlet wall, and sidewalls extending from the inlet wall to the outlet wall. The inlet wall, outlet wall, and sidewalls define a glass melting space enclosed by a floor and a top. In embodiments, the inlet wall may comprise a glass contact wall comprising a glass contact surface facing the glass melting space. A superstructure of the inlet wall comprises a jack arch positioned over the glass contact wall and at least a portion of the glass melting space. A plane of an interior face of the jack arch and a plane of the glass contact surface are off-set in a horizontal direction. A vertical distance from the floor to an underside of the jack arch is less than a vertical distance from the floor to an underside of the top.

18 Claims, 9 Drawing Sheets

(51) Int. Cl.
*C03B 5/04* (2006.01)
*C03B 5/167* (2006.01)

(56) References Cited

U.S. PATENT DOCUMENTS

| | | | | |
|---|---|---|---|---|
| 1,949,380 A | * | 2/1934 | Soubier | C03B 7/01 65/347 |
| 1,973,689 A | * | 9/1934 | Geer | C03B 5/04 432/2 |
| 1,991,331 A | * | 2/1935 | Morton | C03B 5/42 65/342 |
| 1,999,761 A | * | 4/1935 | Howard | C03B 3/00 432/248 |
| 2,029,052 A | | 1/1936 | Bowen | |
| 2,038,797 A | * | 4/1936 | Lufkin | C03B 7/04 65/340 |
| 2,061,367 A | * | 11/1936 | Morton | C03B 5/187 65/135.3 |
| 2,098,440 A | * | 11/1937 | Tassick | C03B 7/01 65/345 |
| 2,172,030 A | * | 9/1939 | Moran | E21D 11/15 405/150.2 |
| 2,246,364 A | * | 6/1941 | Kinker | C03B 7/01 65/337 |
| 2,548,908 A | | 4/1951 | Pollen | |
| 3,201,219 A | * | 8/1965 | Frazier | C03B 5/04 65/347 |
| 3,340,031 A | * | 9/1967 | Zellers, Jr. | C03B 15/02 65/27 |
| 3,362,808 A | * | 1/1968 | Lyle | C03B 5/03 65/335 |
| 3,435,578 A | | 4/1969 | Pearl et al. | |
| 3,442,635 A | * | 5/1969 | Javaux | F27D 1/00 65/168 |
| 3,463,472 A | * | 8/1969 | Worner | C22B 5/00 266/162 |
| 3,511,630 A | | 5/1970 | Hickey | |
| 3,650,726 A | * | 3/1972 | Hynd | C03B 5/42 65/347 |
| 4,062,667 A | * | 12/1977 | Hatanaka | C03B 5/04 65/136.1 |
| 4,197,109 A | * | 4/1980 | Frazier | C03B 5/04 65/335 |
| 4,219,326 A | * | 8/1980 | Walton | C03B 5/04 432/247 |
| 4,481,024 A | | 11/1984 | Bly | |
| 4,632,690 A | * | 12/1986 | Colwell, Jr. | B09B 3/005 422/168 |
| 4,897,103 A | | 1/1990 | Weilacher | |
| 5,002,600 A | | 3/1991 | Sorg et al. | |
| 5,683,484 A | * | 11/1997 | Pieper | C03B 5/005 65/134.5 |
| 5,728,190 A | * | 3/1998 | Pieper | C03B 3/00 588/252 |
| 6,085,551 A | * | 7/2000 | Pieper | C03B 5/04 373/122 |
| 6,705,241 B2 | * | 3/2004 | Abdullah | C01B 3/36 432/252 |
| 8,196,432 B2 | * | 6/2012 | Jacques | C03C 3/064 65/134.1 |
| 8,945,462 B2 | | 2/2015 | Taira | |
| 8,973,406 B2 | | 3/2015 | Fraley et al. | |
| 9,533,905 B2 | * | 1/2017 | Charbonneau | C03B 5/173 |
| 2004/0079113 A1 | * | 4/2004 | Hegewald | C03B 5/235 65/29.11 |
| 2011/0019712 A1 | | 1/2011 | Geib | |
| 2011/0197633 A1 | * | 8/2011 | Tomamoto | C03B 17/06 65/94 |
| 2011/0291310 A1 | * | 12/2011 | Calderon Degollado | C03B 5/43 264/34 |
| 2012/0070252 A1 | | 3/2012 | Waltert | |
| 2013/0114638 A1 | * | 5/2013 | Lindig | C03B 5/04 373/34 |
| 2013/0167587 A1 | | 7/2013 | Lindig et al. | |
| 2014/0007622 A1 | * | 1/2014 | Shock | C03B 5/26 65/135.9 |
| 2014/0090423 A1 | * | 4/2014 | Charbonneau | C03B 5/173 65/134.5 |
| 2014/0116095 A1 | * | 5/2014 | Fraley | F27D 1/0003 65/181 |
| 2015/0336834 A1 | * | 11/2015 | Mobley | C03B 5/2356 65/134.5 |
| 2017/0369352 A1 | * | 12/2017 | Huber | F23C 3/004 |
| 2018/0208492 A1 | * | 7/2018 | Peng | C03B 5/027 |
| 2020/0339462 A1 | * | 10/2020 | Cabodi | C03B 5/43 |
| 2021/0024398 A1 | * | 1/2021 | Fang | C03B 5/43 |

FOREIGN PATENT DOCUMENTS

| | | | | |
|---|---|---|---|---|
| CN | 102643011 A | | 8/2012 | |
| CN | 105008290 A | | 10/2015 | |
| CN | 105481230 A | | 4/2016 | |
| CN | 205528369 U | | 8/2016 | |
| EP | 0019007 A1 | * | 11/1980 | C03B 5/235 |
| JP | 47-019554 B | | 6/1972 | |
| JP | 10-036122 A | | 2/1998 | |
| JP | 10316433 A | | 12/1998 | |
| JP | 2008-001538 A | | 1/2008 | |
| JP | 05282619 B2 | | 9/2013 | |
| KR | 2003035097 A | | 5/2003 | |
| KR | 773142 B1 | | 11/2007 | |
| TW | 201418180 A | | 5/2014 | |

OTHER PUBLICATIONS

International Search Report and Written Opinion of the International Searching Authority; PCT/US2018/039872; dated Oct. 25, 2018; 15 Pages; Korean Intellectual Property Office.
Japanese Patent Application No. 2019-570139, Office Action, dated Jan. 12, 2022, 4 pages (2 pages of English Translation and 2 pages of Original Copy); Japanese Patent Office.
Taiwanese Patent Application No. 107122298, Office Action dated Oct. 12, 2021, 4 pages (English Translation Only); Taiwanese Patent Office.
Chinese Patent Application No. 201880044143.9, Office Action dated Oct. 21, 2021, 5 pages English Translation, Chinese Patent Office.

* cited by examiner

MELTERS FOR GLASS FORMING APPARATUSES

CROSS-REFERENCE TO RELATED APPLICATION

This application claims the benefit of priority under 35 U.S.C. § 371 of International Application No. PCT/US18/39872, filed on Jun. 27, 2018, which claims the benefit of priority of U.S. Provisional Application Ser. No. 62/525,813 filed Jun. 28, 2017 on the contents of which are relied upon and incorporated herein by reference in their entirety as if fully set forth below.

BACKGROUND

Field

The present specification generally relates to glass manufacturing apparatuses and, more specifically, to melters for melting glass batch materials to form molten glass and glass manufacturing apparatuses comprising the same.

Technical Background

Optical quality glass sheets are commonly employed in a variety of optical display devices including LCD displays, LED displays, and the like. Various manufacturing processes may be used to produce the optical quality glass sheets. These manufacturing processes generally involve melting glass batch material in ceramic refractory furnaces (i.e., melters), and then producing a ribbon of glass from the molten glass by drawing the molten glass from a forming body. Individual glass sheets are then cut from the ribbon of glass.

Degradation of components used in the manufacture of glass ribbons may introduce defects in the glass ribbons, rendering the glass ribbons unsuitable for their intended applications. For example, exposure of components in the glass manufacturing apparatus to high temperatures in the glass manufacturing apparatus over extended periods of time may lead to the breakdown of materials, which breakdown introduces defects into the glass manufacturing process. Alternatively or additionally, direct contact between manufacturing components and molten glass may lead to the corrosion of materials which may also introduce defects into the glass manufacturing process.

Finished glass sheets which contain defects are generally discarded and, as a result, manufacturing costs are increased and manufacturing efficiencies are decreased.

Accordingly, a need exists for alternative glass manufacturing apparatuses, and/or components of glass manufacturing apparatuses such as melters, which reduce the occurrence of defects in the glass ribbons produces therefrom.

SUMMARY

According to one embodiment, a melter for melting glass batch materials may comprise an inlet wall, an outlet wall positioned opposite the inlet wall, and a pair of sidewalls extending from the inlet wall to the outlet wall. The inlet wall, the outlet wall, and the pair of sidewalls define a glass melting space of the melter enclosed by a floor portion and a top. The inlet wall may include a glass contact wall supported on the floor portion and comprising a glass contact surface facing the glass melting space. A superstructure may be positioned over the glass contact wall. The superstructure may comprise a jack arch positioned over at least a portion of the glass contact wall and over at least a portion of the glass melting space. A plane of an interior face of the jack arch and a plane of the glass contact surface are off-set from one another in a horizontal direction. A vertical distance from the floor portion to an underside of the jack arch is less than a vertical distance from the floor portion to an underside of the top.

According to another embodiment, a melter for melting glass batch materials, may include an inlet wall, an outlet wall positioned opposite the inlet wall, and a pair of sidewalls extending from the inlet wall to the outlet wall, the inlet wall, the outlet wall, and the pair of sidewalls defining a glass melting space of the melter enclosed by a floor portion and a top. The inlet wall may comprise a glass contact wall supported on the floor portion, the glass contact wall comprising a glass contact surface facing the glass melting space. The inlet wall may further comprise a superstructure positioned over the glass contact wall. The superstructure may comprise a jack arch positioned over at least a portion of the glass contact wall and at least a portion of the glass melting space. A plane of an interior face of the jack arch and a plane of the glass contact surface may be off-set from one another in a horizontal direction. A vertical distance from the floor portion to an underside of the jack arch is less than a vertical distance from the floor portion to an underside of the top. In addition, at least three batch inlet ports may extend through the inlet wall. The melter may further comprises a plurality of burners, wherein the burners immediately adjacent to the interior face of the jack arch are above an underside of the jack arch.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
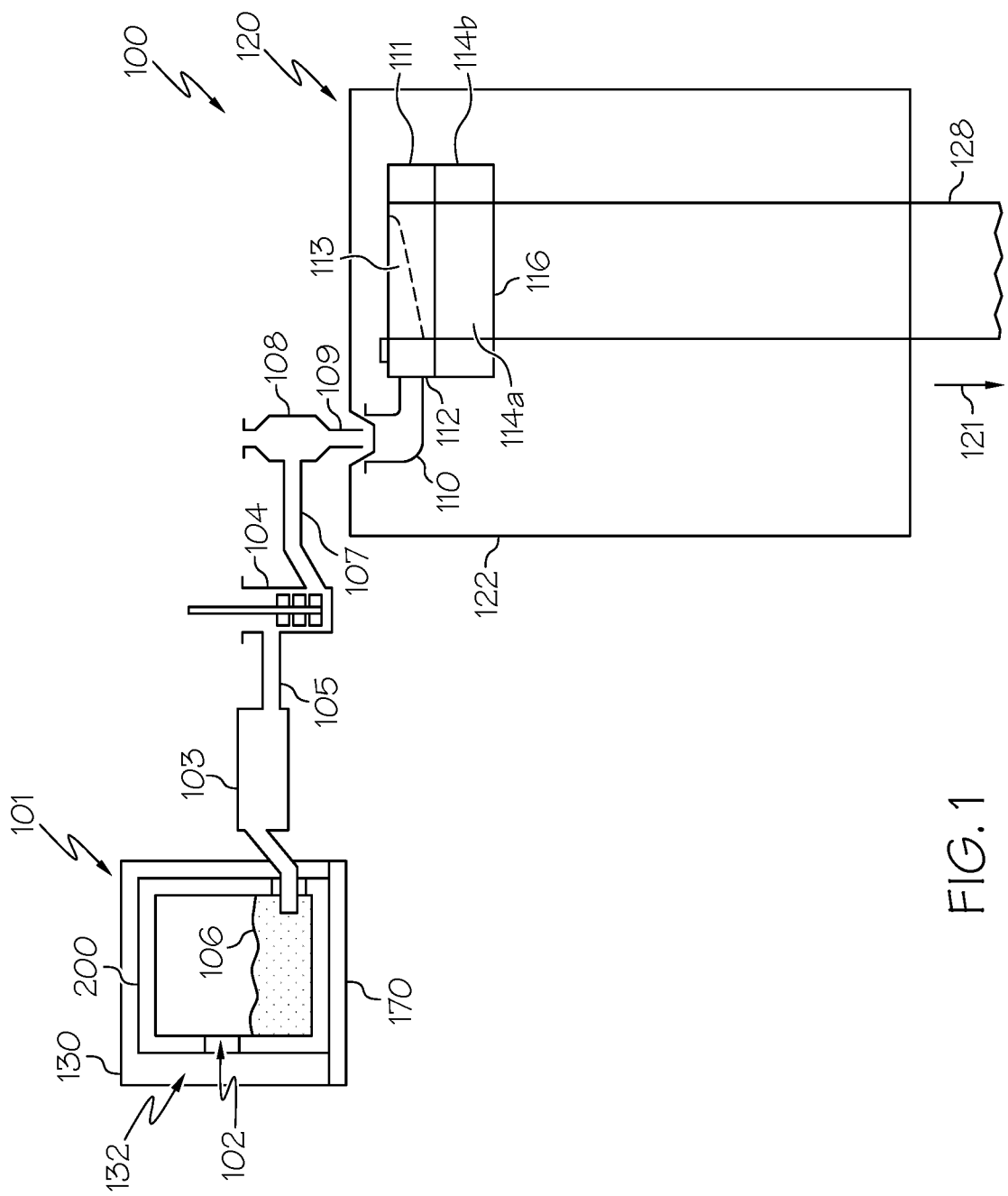
FIG. 1 schematically depicts a glass manufacturing apparatus according to one or more embodiments shown and described herein.

Reference will now be made in detail to embodiments of melters for glass forming apparatuses, examples of which are illustrated in the accompanying drawings. Whenever possible, the same reference numerals will be used throughout the drawings to refer to the same or like parts. One embodiment of a melter is schematically depicted in cross section in FIGS. 2-4. The melter generally comprises an inlet wall, an outlet wall positioned opposite the inlet wall, and a pair of sidewalls extending from the inlet wall to the outlet wall. The inlet wall, the outlet wall, and the pair of sidewalls define a glass melting space of the melter enclosed by a floor portion and a top. The inlet wall may include a glass contact wall supported on the floor portion and comprising a glass contact surface facing the glass melting space. A superstructure may be positioned over the glass contact wall. The superstructure may comprise a jack arch positioned over at least a portion of the glass contact wall and over at least a portion of the glass melting space. A plane of an interior face of the jack arch and a plane of the glass contact surface are off-set from one another in a horizontal direction. A vertical distance from the floor portion to an underside of the jack arch is less than a vertical distance from the floor portion to an underside of the top. The melter and various components of the melter will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Glass stock material, such as glass sheets, may generally be formed by melting glass batch material to form molten glass and forming the molten glass into a final glass product such as a glass ribbon. Exemplary processes for forming glass ribbons include the float glass process, the slot draw process and the fusion downdraw process.

Referring to FIG. 1 by way of example, an exemplary glass manufacturing apparatus 100 for forming glass ribbons from molten glass is schematically depicted in which a fusion draw machine is used to form the molten glass into a glass ribbon. The glass manufacturing apparatus 100 includes a melter 101, a fining vessel 103, a mixing vessel 104, a delivery vessel 108, and a fusion draw machine (FDM) 120. Glass batch material is introduced into the melter 101 through a batch inlet port 102. The batch material is melted in the melter to form molten glass 106. The fining vessel 103 comprises a high temperature processing area that receives the molten glass 106 from the melter 101 and in which dissolved gases and/or bubbles are removed from the molten glass 106. The fining vessel 103 is fluidly coupled to the mixing vessel 104 by a connecting tube 105. That is, molten glass flowing from the fining vessel 103 to the mixing vessel 104 flows through the connecting tube 105. The mixing vessel 104 is, in turn, fluidly coupled to the delivery vessel 108 by a connecting tube 107 such that molten glass flowing from the mixing vessel 104 to the delivery vessel 108 flows through the connecting tube 107.

The delivery vessel 108 supplies the molten glass 106 through a downcomer 109 into the FDM 120. The FDM 120 comprises an enclosure 122 in which an inlet 110 and a forming vessel 111 are positioned. As shown in FIG. 1, the molten glass 106 from the downcomer 109 flows into an inlet 110 which leads to the forming vessel 111. The forming vessel 111 includes an opening 112 that receives the molten glass 106 which flows into a trough 113 and then overflows and runs down two converging sides 114a and 114b before fusing together at a root, where the two sides join, before being contacted and drawn in a downstream direction 121 to form a continuous glass ribbon 148.

While FIG. 1 schematically depicts a glass manufacturing apparatus 100 for forming glass ribbon using a fusion draw machine, it should be understood that other processes may be used to form the glass ribbon, including, without limitation, the float glass process, the slot draw process or the like. Further, while the glass manufacturing apparatus 100 is depicted as being used for forming glass ribbon, it should be understood that similar glass manufacturing apparatuses may be used for forming glass stock material other than glass sheets including, without limitation, glass tubes and the like.

It has been found that the degradation of components of the glass manufacturing apparatus 100, such as portions of the melter 101, may lead to the presence of defects in the glass ribbon produced therefrom. For example, the batch material for forming the molten glass may enter the melter through a batch inlet port in the inlet wall of the melter, as described above. This batch inlet port may be positioned above the glass contact portion of the inlet wall (i.e., above the portion of the melter that is in direct contact with the molten glass and which is generally formed from refractory blocks such as, for example, zirconia refractory blocks). The batch material, which is introduced into the melter in a solid, granular form, initially "floats" on top of the molten glass until the batch material melts and dissolves into the molten glass already present in the melter. Heating of the batch material may be achieved by electrodes submerged in the molten glass, heat imparted to the batch material from the molten glass, as well as from burners or other heating elements located in an upper portion of the melter above the molten glass. When the batch material contains constituent components which have relatively low melting temperatures, such as boron or compounds of boron, these components may melt and dissolve into the molten glass more quickly than the remainder of the batch material prior to the batch material flowing away from the inlet wall and towards an outlet wall of the melter. As a result, the molten glass proximate the glass contact portion of the inlet wall may have a higher concentration of the constituent components with low melting temperatures due to the rapid dissolution of these constituent components upon entry of the batch material into the melter proximate the inlet wall.

For batch material which contains boron or compounds of boron, the dissolved boron in the molten glass infiltrates into the refractory material of the glass contact portion of the inlet wall and causes grains of the refractory material to loosen and dislodge into the molten glass. Smaller grains of refractory material may dissolve into the molten glass. However, larger grains of refractory material may not dissolve in the molten glass and ultimately become defects (i.e., refractory defects) in the glass ribbon formed from the molten glass. In addition to causing defects in the glass ribbon, the interaction between the boron or compounds of boron from the batch material and the refractory blocks of the glass contact portion causes the glass contact portion to degrade, shortening the service life of the melter and, in turn, the glass manufacturing apparatus.

The occurrence of these types of defects in the glass ribbon may increase with increasing glass flow through the melter and the glass manufacturing apparatus. For example, increasing the glass flow through the melter necessitates increasing the amount of glass batch material entering the melter through the batch inlet port in the inlet wall. As a result, the residence time of the batch material on the molten glass may also increase before the batch material is completely melted and dissolved into the molten glass. Exposure of the constituent components with low melting temperatures to the overhead burners or other heating elements during this extended residence time on the surface of the molten glass may cause an even higher concentration of the constituent components with low melting temperatures (such as boron or compounds of boron) to be present in the molten glass proximate the glass contact portion of the inlet wall. This higher concentration of constituent components with low melting temperatures, in turn, increases the number refractory defects in the molten glass and resultant glass ribbon and also accelerates the degradation of the refractory blocks of the glass contact portion of the inlet wall.

In addition to the foregoing, it has been found that bubbles in the molten glass which result from outgassing of the refractory, trapped air in the batch material, and/or degradation of the batch material may also exacerbate the degradation of the refractory block of the glass contact portion of the inlet wall. In particular, it has been found that bubbles of dissolved gas tend to travel along the surface of the glass contact portion from the floor portion of the melter to the surface of the molten glass. The interaction between the bubbles and the refractory block of the glass contact portion can erode the refractory block and form grooves in the surface of the refractory block, a process which is referred to as "upward drilling." This process further accelerates the degradation of the refractory block of the glass contact portion.

The melters for glass manufacturing apparatuses described herein mitigate one or more of the aforementioned problems. In addition, the melters described herein may also provide increased throughput of molten glass through the glass manufacturing apparatuses without increasing the number of defects present in the resultant glass ribbon.

Figure 2:
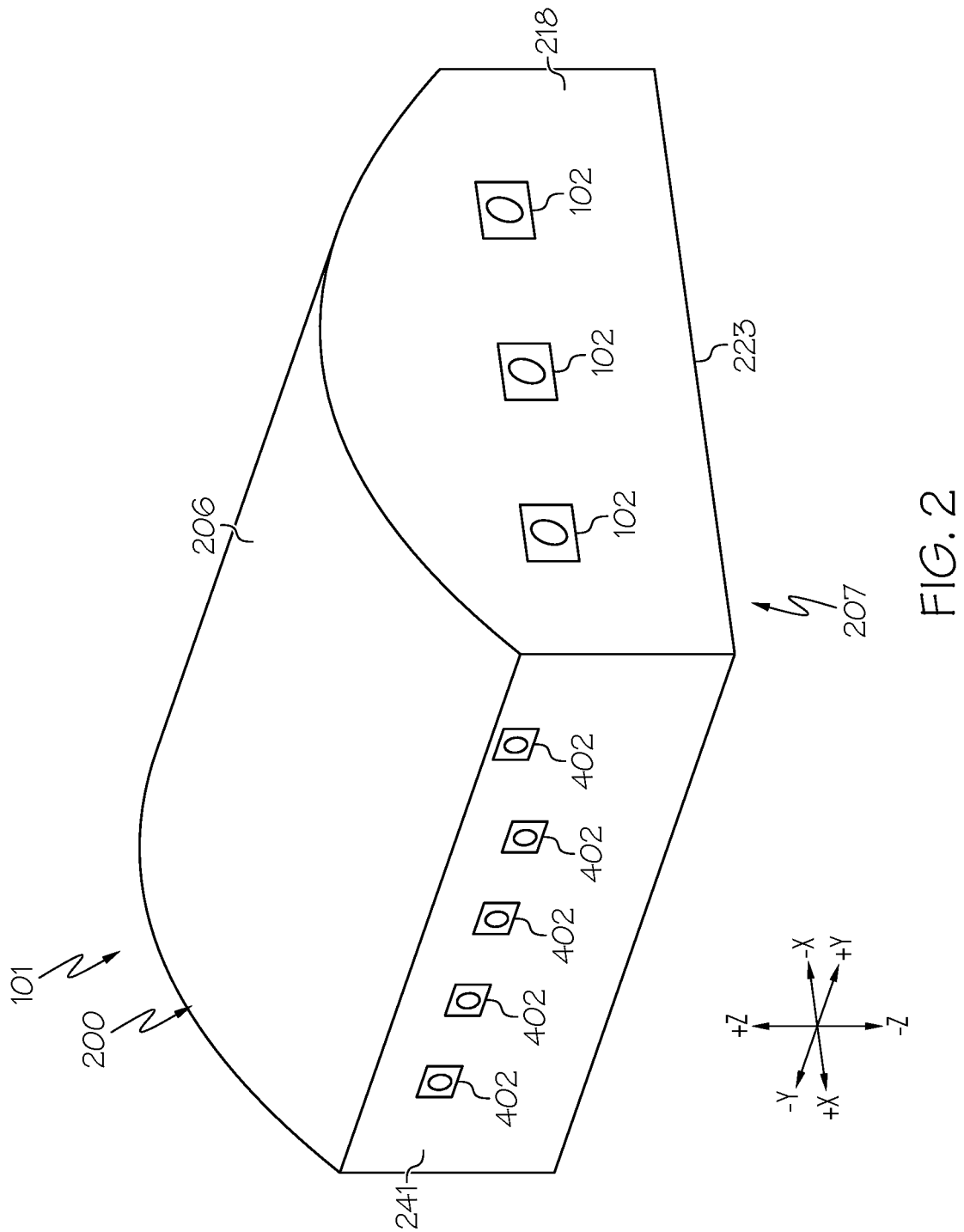
FIG. 2 schematically depicts an isometric rear view of a melter for a glass manufacturing apparatus according to one or more embodiments shown and described herein.
Figure 3:
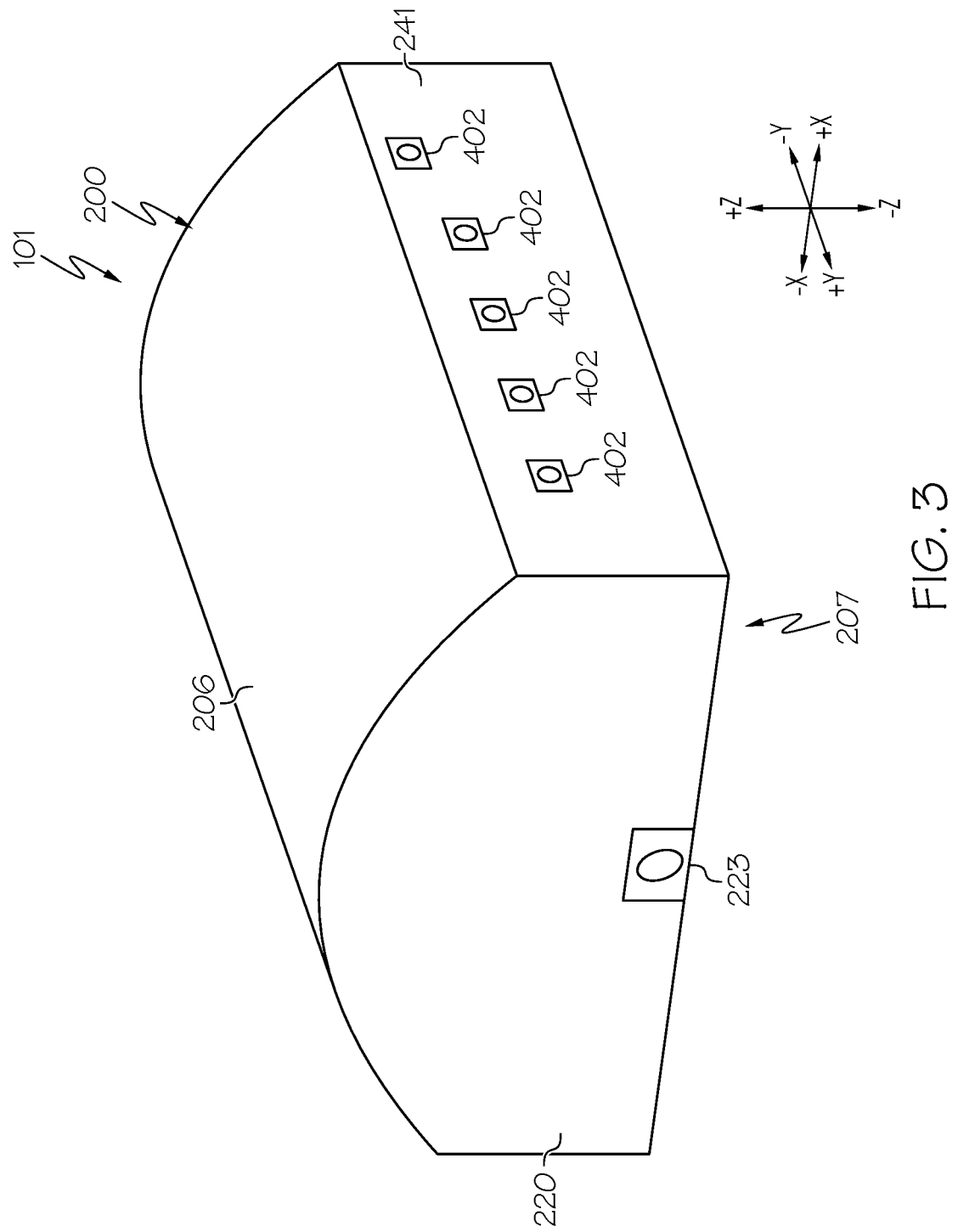
FIG. 3 schematically depicts an isometric front view of a melter for a glass manufacturing apparatus according to one or more embodiments shown and described herein.
Figure 4:
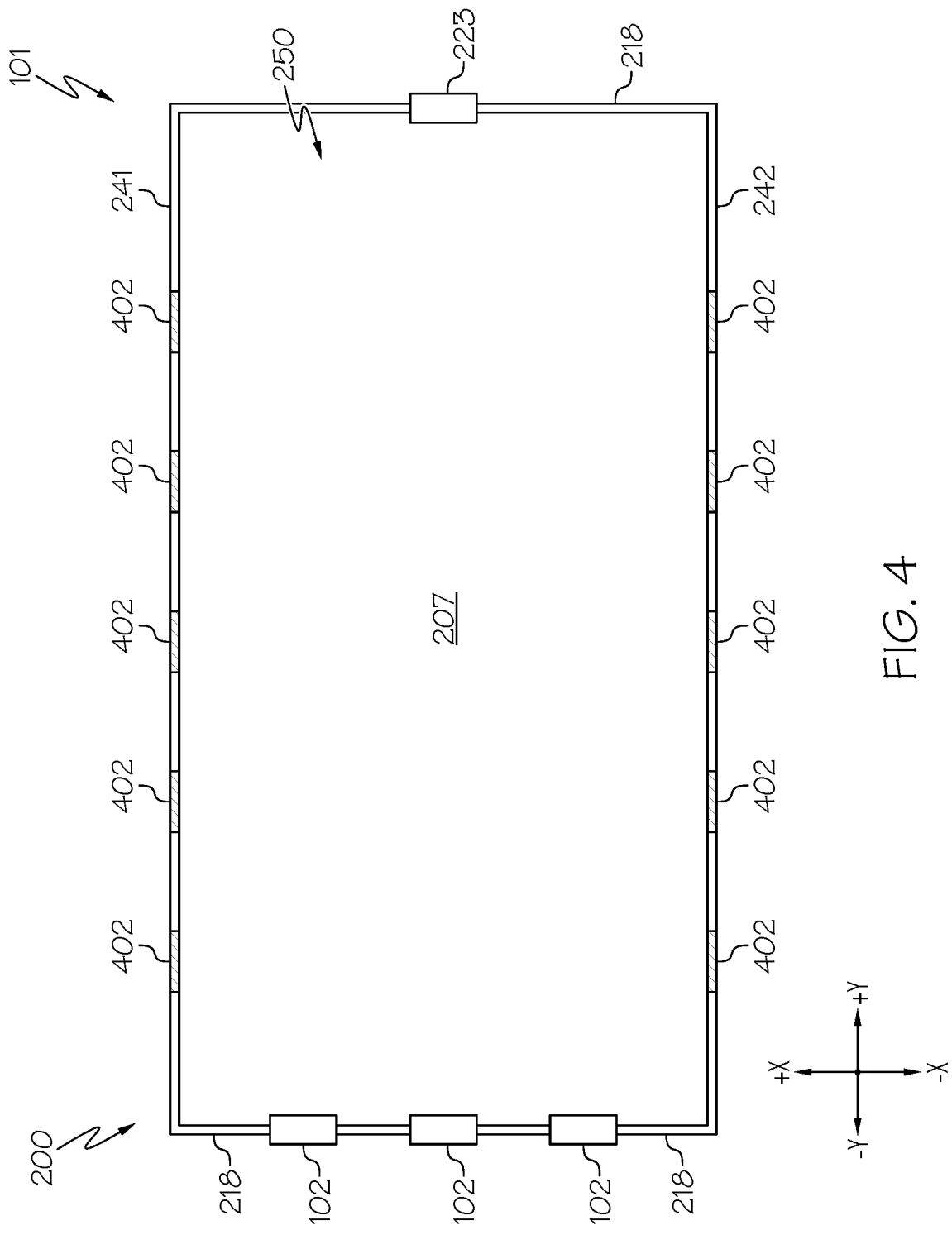
FIG. 4 schematically depicts a cross section of the melter in the length direction of the melter.

Referring now to FIGS. 1-4, a melter 101 for use in a glass manufacturing apparatus 100 is schematically depicted from the rear (FIG. 2), from the front (FIG. 3), and in X-Y cross section (FIG. 4). The melter 101 comprises an exoskeleton 130 and a base portion 170. The exoskeleton 130 generally defines an exoskeleton interior volume 132. The melter 101 comprises a tank assembly 200 which is supported on the base portion 170 in the exoskeleton interior volume 132. In embodiments, the tank assembly 200 is positioned on the base portion 170 and spaced apart from the exoskeleton 130. The tank assembly 200 of the melter 101 includes an inlet wall 218 (FIG. 2) comprising a plurality of batch inlet ports 102 through which glass batch material may be introduced into the interior of the tank assembly 200 for melting. The tank assembly 200 also comprises an outlet wall 220 opposite the inlet wall 218 in the length direction of the melter 101 (i.e., the +/−Y direction the coordinate axes depicted in the figures). The outlet wall includes an outlet port 223 through which molten glass issues from the tank assembly 200 of the melter 101. The tank assembly 200 of the melter 101 further comprises a pair of sidewalls 241, 242 (sidewall 241 is depicted in each of FIGS. 2 and 3; sidewalls 241, 242 are depicted in the cross section of the tank assembly schematically depicted in FIG. 4) which are opposed to one another in a width direction (i.e., the +/−X direction of the coordinate axes depicted in FIGS. 2 and 3) of the melter 101. The pair of sidewalls 241, 242 connect the inlet wall 218 and the outlet wall 220. In the embodiments described herein, the melter 101 includes a plurality of burners 402 arrayed in the length direction of the melter 101. In embodiments, the burners 402 may be located in or on the sidewalls 241, 242 of the tank assembly 200. As noted herein, the burners 402 facilitate melting the batch material as it enters the melter 101 and also assist in maintaining the temperature of the molten glass within the melter 101.

In addition to the inlet wall 218, outlet wall 220, and sidewalls 241, 242, the tank assembly 200 of the melter 101 further includes a top 206 (also referred to as a "crown") and a floor portion 207 (FIG. 4) which connect the inlet wall 218, outlet wall 220, and the sidewalls 241, 242. The inlet wall 218, the outlet wall 220, the sidewalls 241, 242, and the floor portion 207 enclose a glass melting space 250 of the tank assembly 200 of the melter 101. In the embodiments described herein, each of the inlet wall 218, the outlet wall 220, the sidewalls 241, 242, and the floor portion 207 are constructed from refractory materials, such as bricks and blocks formed from ceramic refractories, as will be described in further detail herein. The term "refractory materials," as used herein, refers to materials that are able to withstand the high temperatures of a glass manufacturing (specifically melting) process with minimal degradation. Refractory materials, specifically refractory blocks, used to construct the melter 101 are generally ceramic materials, such as alumina, zirconia, and the like, but it should be understood that other refractory materials are contemplated and possible including, without limitation, refractory metals and refractory alloys.

Still referring to FIGS. 1-4, the exoskeleton 130 (FIG. 1) of the melter 101 is coupled to the tank assembly 200 with, for example, pressure bolts. In some embodiments, the pressure bolts may be spring-loaded pressure bolts that allow for the expansion and contraction of the refractory blocks. In embodiments, the pressure bolts are positioned in support members which, in turn, are rigidly affixed to the exoskeleton 130. Alternatively, the pressure bolts may be affixed to (and extend through) portions of the exoskeleton 130.

Figure 5:
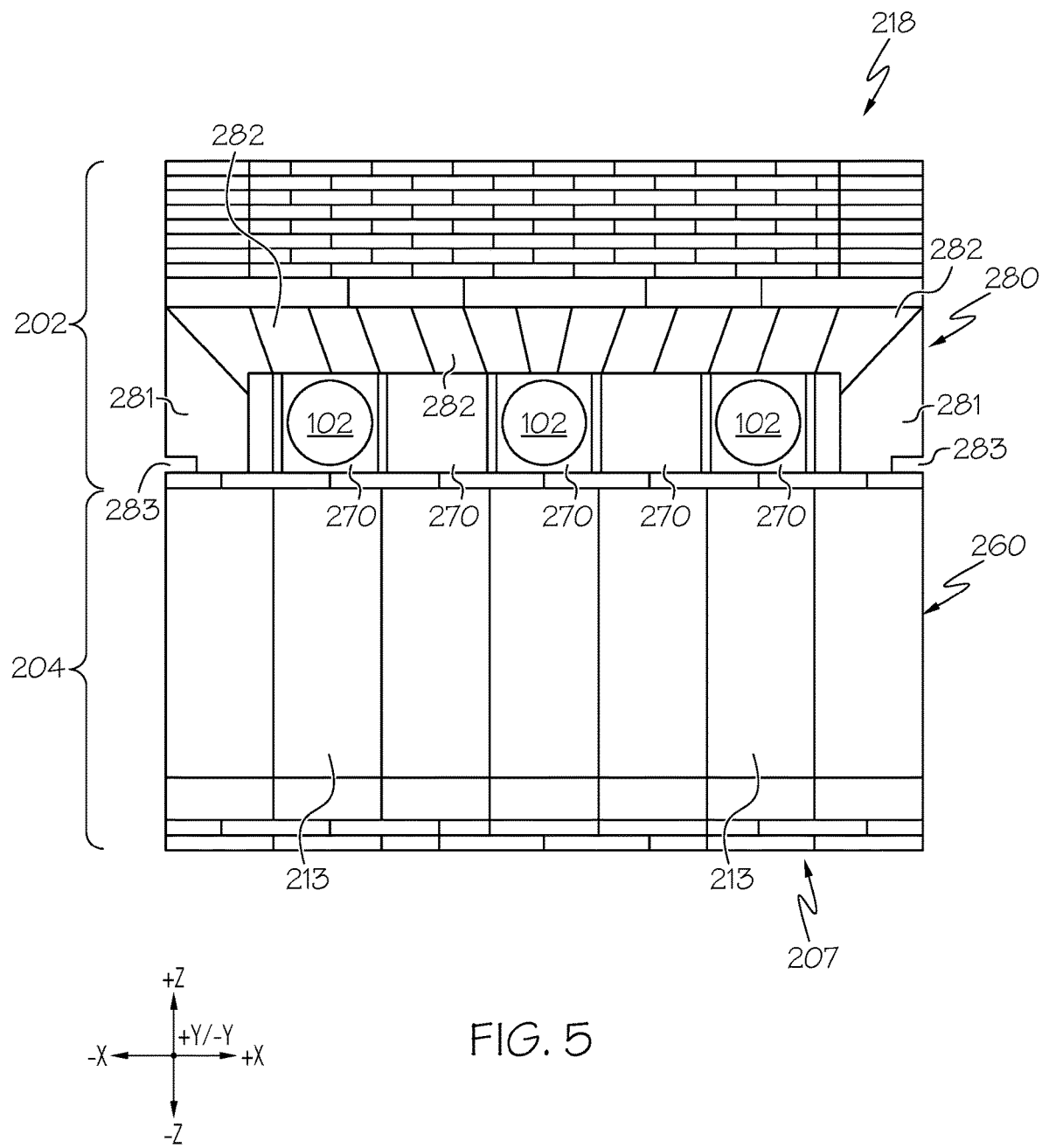
FIG. 5 schematically depicts the inlet wall of the melter of FIGS. 2-4 without the exoskeleton.
Figure 6:
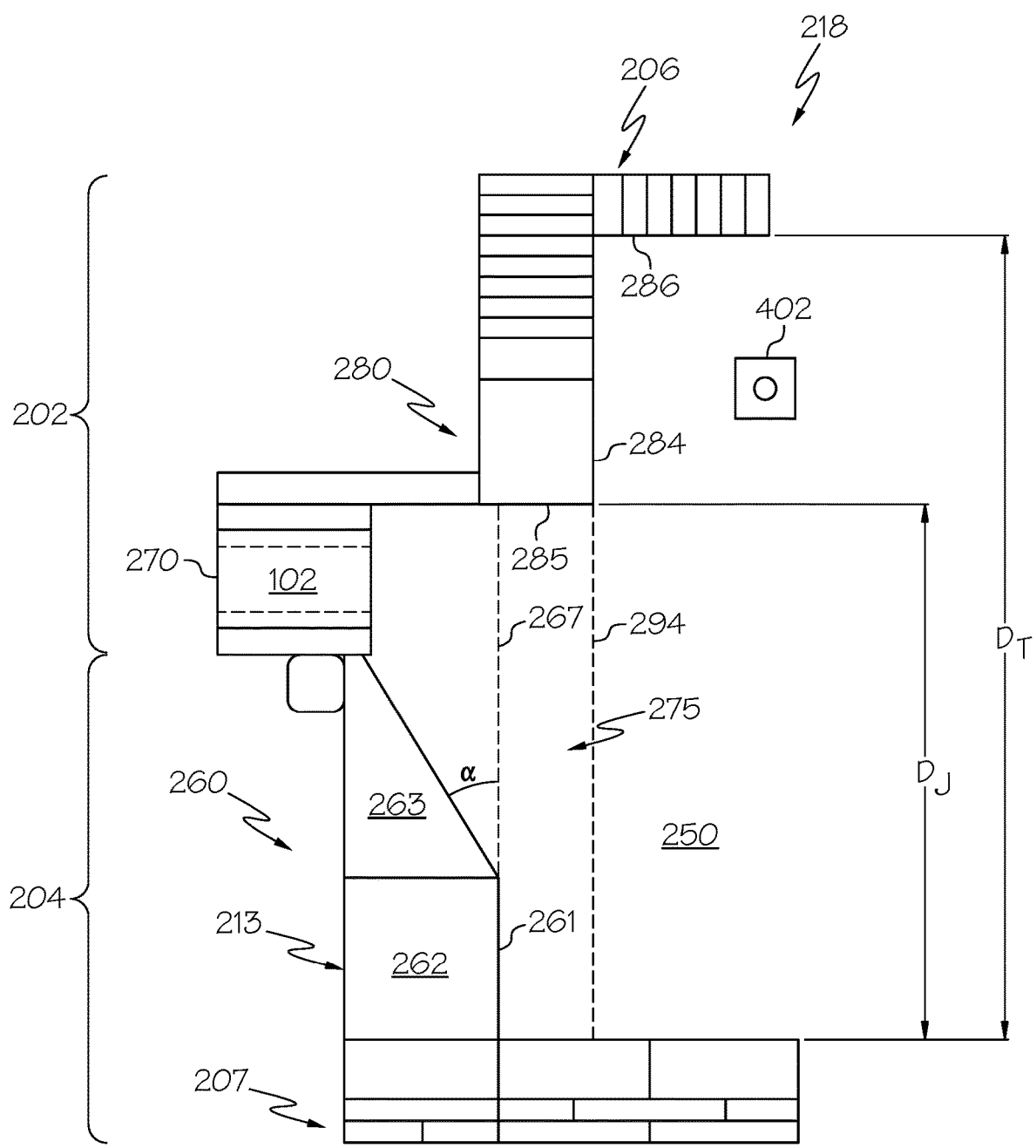
FIG. 6 schematically depicts a cross section of the inlet wall of FIG. 5 according to one or more embodiments shown and described herein.

Referring now to FIGS. 5 and 6, the inlet wall 218 of the tank assembly 200 of FIGS. 2-4 is schematically depicted without the exoskeleton. The inlet wall 218 generally comprises a glass contact portion 204 and a superstructure 202. The glass contact portion 204 is the lower part of the tank assembly 200 where glass batch material is heated and turned into molten glass. That is, the glass contact portion 204 is the portion of the tank assembly 200 that comes into contact with molten glass disposed in the glass melting space 250 of the tank assembly 200 of the melter 101. The superstructure 202 is positioned over the glass contact portion 204 (and the glass contact wall 260 of the glass contact portion 204) and, in some embodiments, is at least partially supported on the glass contact wall 260. The superstructure 202, in turn, supports the top 206 of the tank assembly 200 of the melter 101. In embodiments, the batch inlet ports 102 for receiving glass batch material to be melted in the tank assembly 200 of the melter 101 are positioned in the superstructure 202 of the inlet wall 218.

In the embodiments of the inlet wall 218 described herein, the glass contact portion 204 of the inlet wall 218 comprises a floor portion 207 and a glass contact wall 260. The glass contact wall 260 and the floor portion 207 may be constructed from stacked refractory blocks 213 formed from refractory materials such as alumina, zirconia, or other suitable ceramic refractory material. The refractory blocks 213 of the glass contact wall 260 are supported on the floor portion 207. In embodiments, the refractory blocks 213 of the glass contact wall 260 may be urged into contact with one another with pressure bolts attached to the exoskeleton.

In the embodiments described herein, the glass contact wall 260 includes a glass contact surface 261 that faces the glass melting space 250 of the tank assembly 200. Optionally, at least a portion of the glass contact surface 261 of the glass contact wall 260 is inclined away from the glass melting space 250. In these embodiments, the angle of inclination a of the inclined portion of the glass contact surface 261 may be from about 5 degrees to about 25 degrees with respect to vertical (i.e., with respect to a direction parallel to the +/−Z direction of the coordinate axes depicted in the figures).

In embodiments, the glass contact wall 260 comprises a base portion 262 that is supported on the floor portion 207 and an upper portion 263 supported on the base portion 262, as depicted in FIG. 6. In these embodiments, the glass contact surface of the base portion 262 is substantially vertical and the glass contact surface of the upper portion 263 is oriented at the inclined angle α, as described above. In these embodiments, the upper portion 263 tapers from the base portion 262 to a top of the glass contact wall 260. In other embodiments (not shown), the entire glass contact surface 261 is oriented at the inclined angle α with respect to vertical.

Figure 7A:
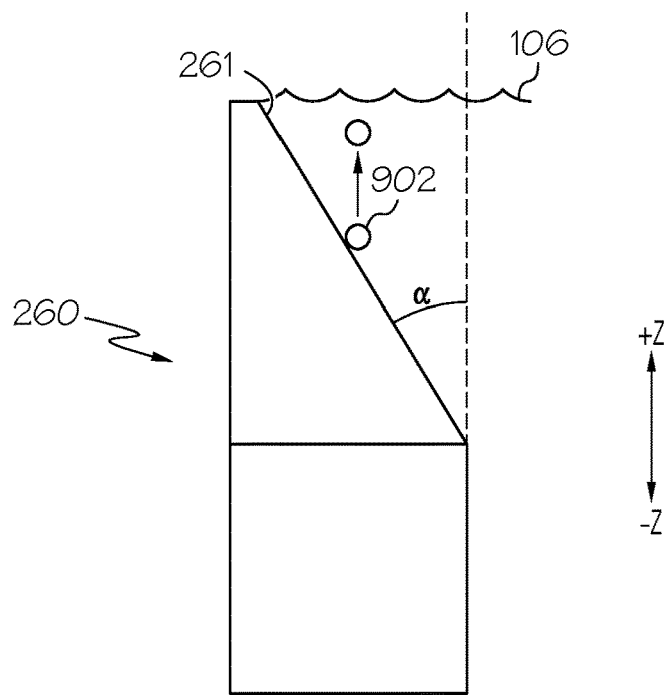
FIGS. 7A and 7B schematically depict refractory blocks that may be used to form the glass contact of the inlet wall according to one or more embodiments shown and described herein.

In embodiments in which at least a portion of the glass contact surface 261 of the glass contact wall 260 is inclined away from the glass melting space 250 of the tank assembly 200, the inclined angle α of at least a portion of the glass contact surface 261 may assist in preventing degradation of the refractory blocks 213 of the glass contact wall 260. Referring to FIGS. 1 and 6-7A by way of example, during operation of the glass manufacturing apparatus 100, the melter 101 contains molten glass 106. The molten glass 106 is at a level within the melter 101 such that the glass contact wall 260 is below the surface of the molten glass 106. That is, the glass contact surface 261 of the glass contact wall 260 is submerged in the molten glass 106. When bubbles 902 in the molten glass 106 travel along the glass contact surface 261 of the glass contact wall 260, as described above, the inclined angle α of the submerged glass contact surface 261 cause the bubbles 902 to release from the glass contact surface 261 and travel vertically upwards and away from the glass contact surface 261, as depicted in FIG. 7A. This mitigates erosion of the glass contact surface 261 due to the bubbles 902.

Figure 7B:
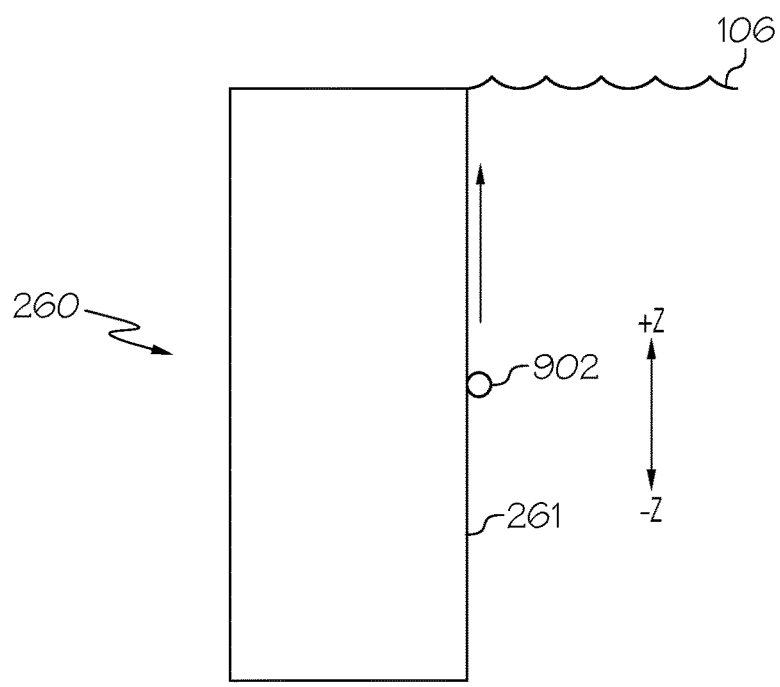

By way of contrast, FIG. 7B depicts a portion of a glass contact wall 260 in which the glass contact surface 261 is vertically oriented. When the glass contact surface 261 of the glass contact wall 260 is vertically oriented, the bubbles 902 traveling vertically upward remain in contact with the glass contact surface 261 and potentially cause erosion of the glass contact surface 261.

Referring again to FIGS. 5 and 6, the superstructure 202 of the inlet wall 218 comprises at least one batch inlet port 102 which extends through refractory blocks 270, and may in some embodiments comprise a plurality of batch inlet ports. As described hereinabove, the at least one batch inlet port 102 facilitates introducing batch material into the glass melting space 250 of the tank assembly 200 of the melter 101. Optionally, the inlet wall 218 may contain at least two batch inlet ports, for example at least three or more batch inlet ports 102 as depicted in FIG. 5. These inlet ports 102 may be equidistantly spaced from each other in the width direction of the inlet wall 218.

In embodiments, incorporating greater than two batch inlet ports 102 in the inlet wall 218, such as at least three batch inlet ports 102, facilitates increasing the flow of molten glass through the melter 101 without increasing the number of refractory defects in the glass ribbon formed by the glass manufacturing apparatus 100. Specifically, the increased number of batch inlet ports 102 allows for a greater amount of batch material to be input into the melter 101. The increased number of batch inlet ports 102 also facilitates distributing the batch material more evenly across the surface of the molten glass in the width direction of the inlet wall 218. By more evenly distributing the batch material across the surface of the molten glass, the concentration of constituent components with low melting temperatures, such as boron and compounds of boron, is more evenly distributed in the molten glass, thereby reducing or mitigating the infiltration of boron into the refractory blocks of the glass contact wall 260 and reducing the number of defects in the glass ribbon formed by the glass manufacturing apparatus 100.

Still referring to FIGS. 5 and 6, the superstructure 202 of the inlet wall 218 further comprises a jack arch 280. The jack arch 280 is constructed from refractory blocks formed from refractory material such as alumina, zirconia, or other suitable ceramic refractory material. In the embodiment of the inlet wall 218 depicted in FIGS. 5 and 6, the jack arch 280 comprises skew blocks 281 and wedge blocks 282. The skew blocks 281 are at least partially supported on the sidewalls 241, 242 (FIGS. 2-4) of the tank assembly 200 of the melter 101 and partially supported by the exoskeleton 130 of the melter such that the lateral load of the arch is transferred to the exoskeleton 130. For example, in embodiments, the skew blocks 281 include support notches 283 for receiving a portion of a support bracket 600 (FIG. 8) affixed to the exoskeleton 130, as will be described in further detail herein. The support bracket 600 couples the jack arch 280 to the exoskeleton 130 of the melter 101.

Still referring to FIGS. 5 and 6, a plurality of wedge blocks 282 are positioned between the skew blocks 281 such that the jack arch 280 extends across the width direction of the inlet wall 218. The wedge blocks 282 are formed with angled mating faces such that, when the wedge blocks are assembled, the angled mating faces of adjacent blocks prevent the vertical displacement of one another. For example, a first wedge block may have an angled mating face with an angle of +30°, and the adjacent wedge block may an angled mating face with an angle of −60°. When the wedge blocks 282 are assembled such that the mating faces are in contact with one another, the weight of the wedge blocks 282 (and hence the weight of the jack arch 280 and any other load supported by the jack arch 280) is transferred laterally (i.e., in the width direction of the inlet wall 218) to the skew blocks 281 and, in turn, to the exoskeleton 130 of the melter 101.

Figure 8:
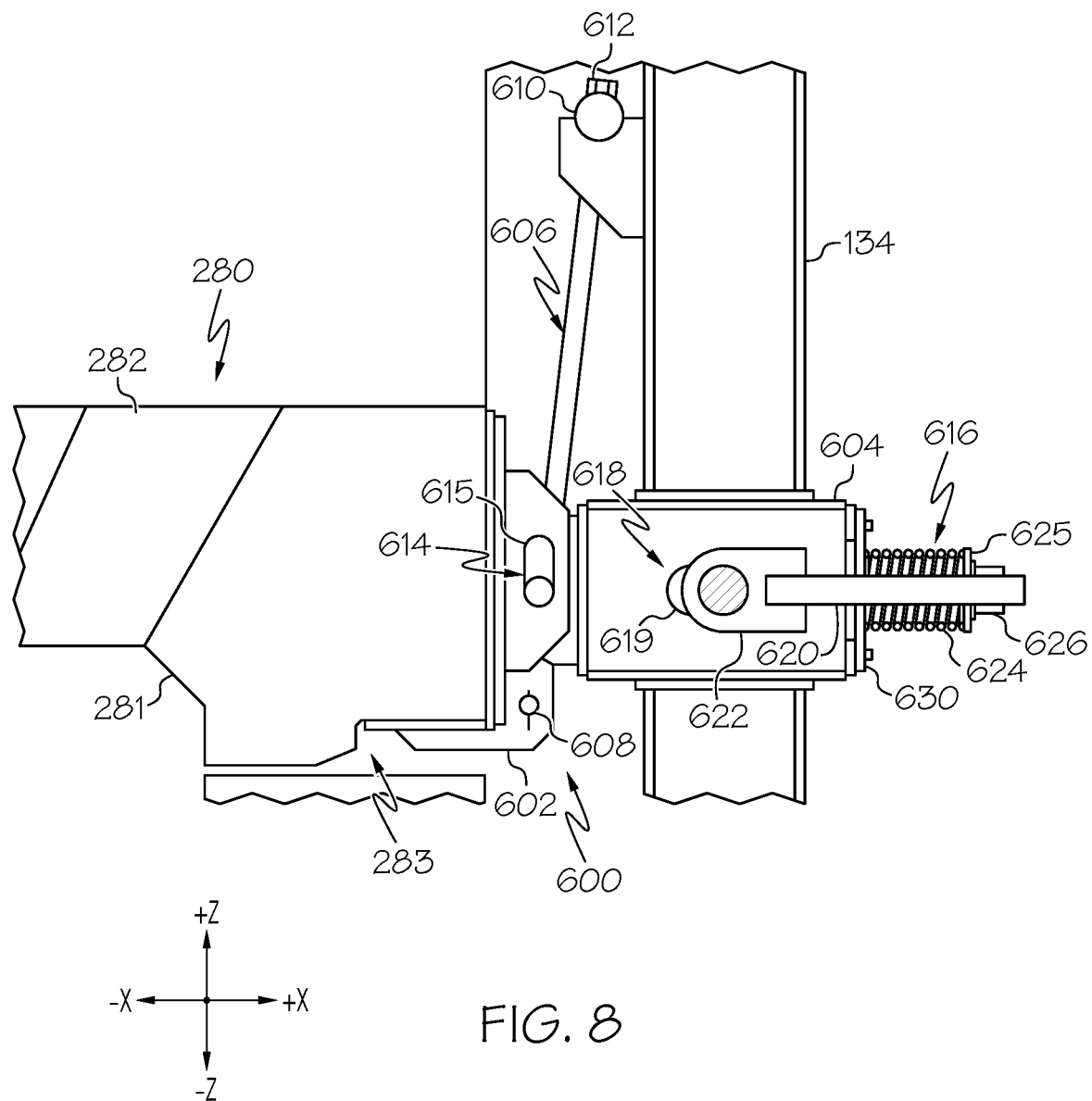
FIG. 8 schematically depicts a bracket for supporting the jack arch of the inlet wall according to one or more embodiments shown and described herein.

Referring now to FIGS. 5 and 8, a support bracket 600 is schematically depicted supporting a skew block 281 of the jack arch 280 on an upright member 134 of the exoskeleton 130 of the melter 101. FIG. 8 schematically depicts a vertical cross section of the support bracket 600 positioned in the upright member 134. While a single support bracket 600 is schematically depicted in FIG. 8, it should be understood that a support bracket may be positioned at either end of the jack arch 280 in the +/−X direction of the coordinate axes depicted in FIG. 8. The support brackets are displaceable and recoverable in the +/−X direction (i.e., the width direction of the inlet wall) to accommodate expansion and contraction of the jack arch 280 during thermal cycling.

In the embodiments described herein, the support bracket 600 generally includes an L-bracket portion 602 and an expansion-contraction sleeve 604. The L-bracket portion 602 is engaged with the support notch 283 formed in the skew block 281 of the jack arch 280 such that L-bracket portion 602 supports at least a portion of the weight of the skew block 281 and the jack arch 280. The support bracket 600 also includes a vertical support strut 606 that is pivotally coupled to the L-bracket portion 602 through a pin-and-clevis connection at a lower pivot point 608 such that the vertical support strut 606 is pivotable with respect to the L-bracket portion 602 in the X-Z plane of the coordinate axes depicted in the figure. The vertical support strut 606 is also coupled to the upright member 134 through a pin-and-clevis connection at an upper pivot point 610 (i.e., the upper pivot point 610 is located above the L-bracket portion 602 of the support bracket 600) such that the vertical support strut 606 is pivotable with respect to the upright member 134 in the X-Z plane of the coordinate axes depicted in the figure. In embodiments, the vertical support strut 606 may be threaded and includes a nut 612 coupling the vertical support strut 606 to the upper pivot point 610. The combination of the nut 612 and the threaded vertical support strut 606 facilitates adjusting the elevation of the L-bracket portion 602 in the +/−Z direction (and, hence, the elevation of the skew block 281 and jack arch 280) by adjustment of the position of the nut 612 on the threaded vertical support strut 606. The lower and upper pivot points 608, 610 accommodate the displacement of the L-bracket portion 602 of the support bracket 600 in the +/−X direction due to the expansion and contraction of the jack arch due to thermal cycling.

Still referring to FIG. 8, the L-bracket portion 602 of the support bracket 600 is pivotally coupled to the expansion-contraction sleeve 604 through a pin-and-clevis connection at a vertically medial pivot point 614. In the embodiment depicted in FIG. 8, the clevis portion of the pin-and-clevis connection at the vertically medial pivot point 614 includes a slot 615 elongated in the +/−Z direction to accommodate elevation adjustments of the L-bracket portion 602 of the support bracket 600 (i.e., the vertically medial pivot point 614 facilitates vertical adjustment of the L-bracket portion 602 of the support bracket 600).

The expansion-contraction sleeve 604 extends through an aperture formed in the upright member 134 such that the expansion-contraction sleeve 604 is slidably displaceable with respect to the upright member 134 in the +/−X direction of the coordinate axes depicted in the figures. The expansion-contraction sleeve 604 includes a spring bolt assembly 616 that extends through the expansion-contraction sleeve 604. The spring bolt assembly 616 is slidably coupled to the expansion-contraction sleeve 604 through a pin-and-clevis connection at a horizontally medial pivot point 618. In the embodiment depicted in FIG. 8, the clevis portion of the pin-and-clevis connection at the horizontally medial pivot point 618 includes a slot 619 elongated in the +/−X direction to accommodate displacement of the expansion-contraction sleeve 604 of the support bracket 600 relative to the upright member 134 and the spring bolt assembly 616 due to expansion and contraction of the skew block 281 and the jack arch 280 (i.e., the horizontally medial pivot point 618 facilitates horizontal displacement of the expansion-contraction sleeve 604 of the support bracket 600).

More specifically, the upright member 134 is mechanically grounded relative to the expansion-contraction sleeve 604. The pin portion 621 of the pin-and-clevis connection at the horizontally medial pivot point 618 extends through a corresponding aperture (not depicted) in the upright member 134 affixing the spring bolt assembly 616 to the upright member 134. In embodiments, the aperture in the upright member is sized to prevent translation of the spring bolt assembly 616 in either the +/−X direction or the +/−Z direction. Accordingly, the connection between the spring bolt assembly 616 and the upright member 134 allows the expansion-contraction sleeve 604 to translate with respect to both the spring bolt assembly 616 and the upright member 134.

The spring bolt assembly 616 generally includes a threaded rod 620 which is engaged with the clevis 622 of the pin-and-clevis connection at the horizontally medial pivot point 618. The threaded rod 620 extends through an end plate 630 affixed to the end of the expansion-contraction sleeve 604 opposite the L-bracket portion 602 (i.e., the distal end of the expansion-contraction sleeve 604 relative to the L-bracket portion 602). The spring bolt assembly 616 also includes a plurality of biasing elements 624, such as compression springs, spring washers, or combinations thereof. The biasing elements 624 are disposed around the threaded rod 620 and positioned between the end plate 630 and a washer 625 and nut 626 positioned on the distal end of the threaded rod 620. The biasing elements 624 exert a force on the expansion-contraction sleeve 604 that urges the expansion-contraction sleeve 604 towards the jack arch 280, thereby imparting a compression force on the jack arch 280 and maintaining the blocks of the jack arch 280 (i.e., the skew blocks 281 and the wedge blocks 282) in position. The combination of the nut 626 and the threaded rod 620 facilitate adjusting the horizontal position of the expansion-contraction sleeve 604 and the L-bracket portion 602 in the +/−X direction (and, hence, the compression force applied to the jack arch 280) by adjustment of the position of the nut 626 on the threaded rod 620. Further, expansion-contraction sleeve 604 being slidably displaceable with respect to the upright member 134, in conjunction with the biasing elements 624, accommodates the expansion and contraction of the jack arch 280 during thermal cycling of the melter while maintaining a constant compression force on the jack arch 280 to keep the blocks of the jack arch in place.

In the embodiments described herein, the jack arch 280 is oriented and positioned in the glass melting space 250 to shield batch material introduced into the melter 101 through the batch inlet ports 102 from at least the burners 402 (or heating elements) closest to the batch inlet ports 102. Specifically, the vertical distance DJ from the floor portion 207 to the underside 285 of the jack arch 280 is less than the vertical distance DT from the floor portion 207 to the underside 286 of the top 206. The jack arch 280 is also positioned over at least a portion of the glass contact wall 260 and at least a portion of the glass melting space 250, as depicted in FIG. 6. In addition, a plane 294 of the front face 284 of the jack arch 280 and a plane 267 of the glass contact surface 261 are off-set from one another in a horizontal direction (i.e., a direction parallel to the +/−Y direction of the coordinate axes depicted in the figures). The plane 294 of the front face 284 of the jack arch 280, as used herein, refers to the X-Z plane in which the portion of the jack arch 280 that extends farthest into the glass melting space 250 in the +Y direction is positioned, as depicted in FIG. 6. The plane 267 of the glass contact surface 261, as used herein, refers to the X-Z plane in which the portion of the glass contact surface 261 which extends farthest into the glass melting space 250 in the +Y direction is positioned, as depicted in FIG. 6. In the embodiments described herein, the X-Z plane(s) are vertical planes that are generally parallel to the outlet wall 220 and perpendicular to the sidewalls 221, 222.

The reduced vertical distance to the underside 285 of the jack arch 280 relative to the underside 286 of the top 206, combined with the offset positioning of the front face 284 of the jack arch 280 relative to the glass contact surface 261 of the glass contact portion 204, creates a recess under the jack arch 280 which at least partially shields the glass batch material entering the glass melting space 250 through the batch inlet ports 102 from the radiative heat in the glass melting space 250. This shielding effect decreases the rate at which constituent components of the batch material with relatively lower melting temperatures melt and dissolve into the molten glass, thereby providing sufficient time for these constituent components of the batch material to flow away from the inlet wall 218 before melting and dissolving into the molten glass. As a result, the concentration of these constituent components in the molten glass proximate the glass contact surface 261 is reduced which, in turn, reduces infiltration of these constituent components into the refractory block of the glass contact wall 260 and mitigates the introduction of refractory defects into the molten glass.

In embodiments, the space between the plane 294 of the front face 284 of the jack arch 280 and the plane 267 of the glass contact surface 261 includes a batch receiving volume 275 that is bounded by at least the floor portion 207 of the melter 101, an underside 285 of the jack arch 280, the plane 294 of the front face 284 of the jack arch 280, and the plane 267 of the glass contact surface 261. The batch receiving volume 275 generally defines the forward-most location in the glass melting space 250 relative to the glass contact surface 261 where the batch material is introduced onto the surface of the molten glass and is shielded from the radiative heat within the glass melting space 250.

In some embodiments, one or more of the burners 402 is positioned relative to the jack arch 280 to further enhance the shielding effect of the jack arch 280. For example, in some embodiments, at least the burners 402 immediately adjacent to the front face 284 of the jack arch 280 are positioned in the sidewall at a level above the underside 285 of the jack arch 280 such that the batch material entering the glass melting space 250 is shielded from the direct heat imparted by these burners 402.

Referring again to FIGS. 2-4, the outlet wall 220 and the sidewalls 241, 242 may have a similar construction as the inlet wall 218 with the exception of the jack arch. That is, each of the outlet wall 220 and the sidewalls 241, 242 may be constructed from blocks of refractory material and each may comprise a glass contact portion and a superstructure over the glass contact portion, as described above with respect to the inlet wall 218. However, in the embodiments described herein, the superstructure of each of the outlet wall 220 and the sidewalls 241, 242 comprises courses of refractory blocks without a jack arch, as depicted in FIG. 4. For example, sidewall 242 in FIG. 4 includes a glass contact portion comprising a glass contact wall, as described hereinabove with respect to the inlet wall 218. The superstructure of the sidewall 242 includes several courses of refractory blocks. The refractory blocks are supported on or over the glass contact wall, as described herein with respect to FIGS. 4 and 5. Each of the outlet wall 220 and the sidewall 241 may be similarly constructed.

Referring to FIGS. 2-3, the top 206 of the tank assembly 200 is likewise constructed from refractory blocks. To form the top 206, the refractory blocks are stacked to form a barrel vault over the glass melting space 250 (FIG. 4) of the tank assembly 200 of the melter 101 using traditional masonry techniques for forming arches and/or vaults.

As described above, the tank assembly 200 is utilized to heat glass batch material and thereby form molten glass in the glass contact portion 204 of the tank assembly. Various techniques may be utilized to heat the tank assembly 200. For example, in the embodiment of the tank assembly 200 depicted in FIGS. 2-4, the tank assembly is electrically heated. Specifically, the tank assembly 200 further comprises a plurality of electrodes (not shown) extending through the refractory blocks of the sidewalls 241, 242 and/or the floor 207. The electrodes deliver electrical energy to the molten glass and/or glass batch material contained within the tank assembly 200. Various configurations of electrodes 214 may be utilized to heat the glass contact portion 204 of the tank assembly 200. Moreover, as noted above, a plurality of burners 402 may be positioned in the sidewall 241, 242 of the tank assembly 200 to supplement the heating provided by the electrodes 214.

Figure 9:
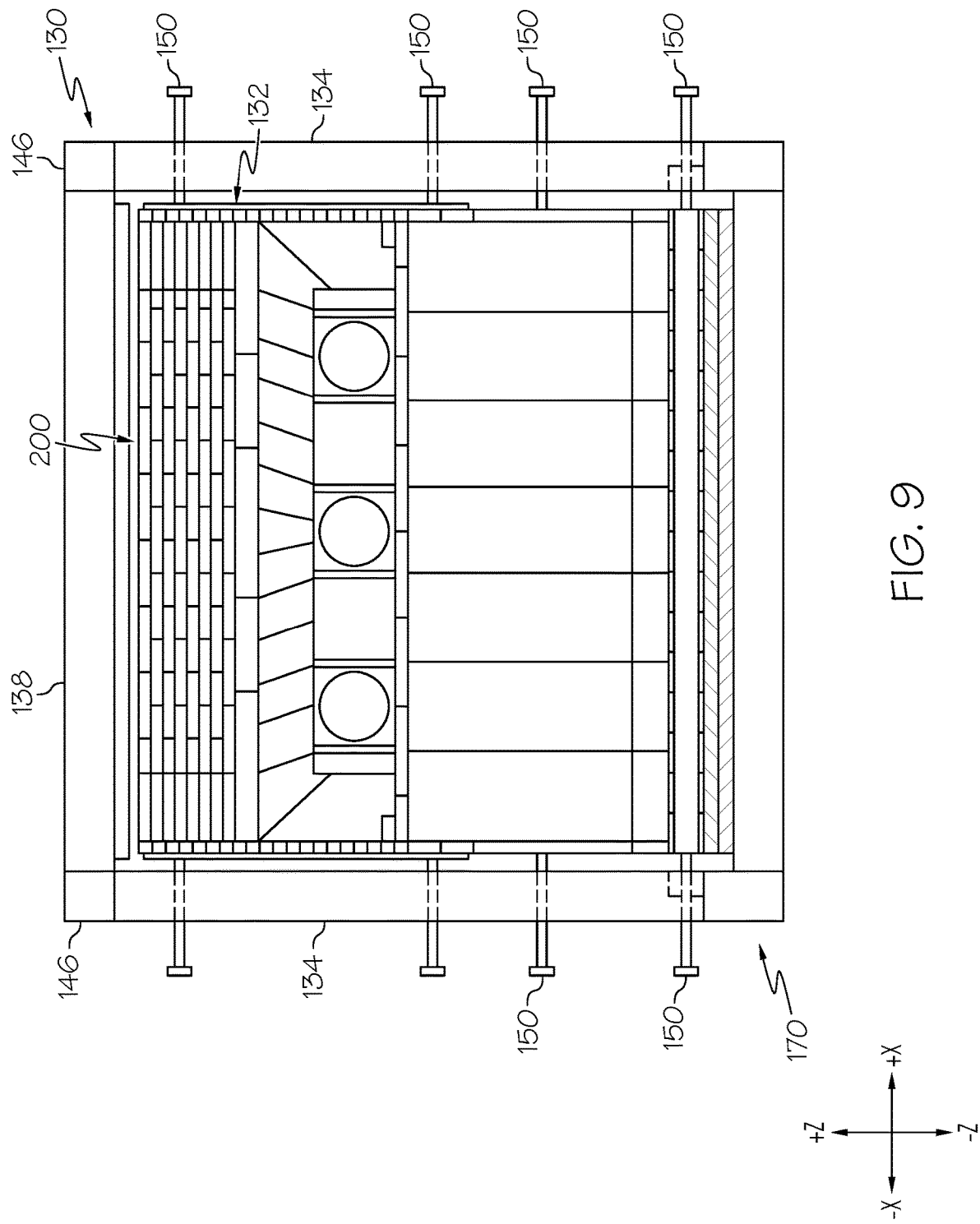
FIG. 9 schematically depicts a cross section of the inlet wall of the melter with the exoskeleton, according to one or more embodiments shown and described herein.

In the embodiments of the melter 101 described herein, the refractory blocks are supported and reinforced by the exoskeleton and attached base portion. Referring now to FIG. 9 by way of example, the exoskeleton 130 is rigidly coupled to the base portion 170 and generally comprises a plurality of upright members 134, a plurality of cross members 138, and a plurality of longitudinal members 146. In the embodiments described herein the plurality of upright members, the plurality of cross members, and the plurality of longitudinal members are interconnected to form the exoskeleton 130 which encloses the exoskeleton interior volume 132. The plurality of upright members 134 are rigidly attached to the base portion 170 by welding and/or mechanical fasteners and extend upwards from the base portion 170 in a substantially vertical direction (i.e., in the +Z direction of the coordinate axes depicted in FIG. 9). The plurality of longitudinal members 146 extend in the longitudinal direction (i.e., in the +/−Y direction of the coordinate axes depicted in FIG. 9) and couple the upright members 134 to the cross members 138.

Referring now to FIGS. 2-3, and 9, the tank assembly 200 is constructed on the base portion 170 such that the tank assembly 200 is located within the exoskeleton interior volume 132 and spaced apart from the exoskeleton 130. Once the tank assembly 200 is constructed, the tank assembly is reinforced by coupling the tank assembly 200 to the exoskeleton 130. In embodiments, coupling the tank assembly 200 to the exoskeleton 130 may be accomplished with pressure bolts 150.

It should now be understood that the melters for glass forming apparatus described herein may mitigate the introduction of refractory defects into the molten glass within the melter and, in turn, reduce the occurrence of refractory defects in glass ribbons formed with the glass forming apparatus. The reduction in refractory defects is due to shielding of the batch material from direct heating upon initial entry of the batch material of the melter and may be further enhanced by evenly distributing the batch material over the surface of the molten glass through the use of multiple batch inlet ports. The use of multiple batch inlet ports also has the added benefit of increasing the flow of glass through the glass manufacturing apparatus, thereby enhancing production output and efficiencies. Another result of shielding the batch material from direct heating upon initial entry of the batch material into the melter is reduced degradation of the refractory blocks forming the glass contact portion of the melter, thereby extending the service life of the melter and the glass manufacturing apparatus. This result may be further enhanced by utilizing glass contact walls with glass contact surfaces having angled faces which mitigate degradation of the glass contact wall due to "upward drilling."

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A melter for melting glass batch materials, the melter comprising:
an inlet wall, an outlet wall positioned opposite the inlet wall, and a pair of sidewalls extending from the inlet wall to the outlet wall, wherein the inlet wall, the outlet wall, and the pair of sidewalls define a glass melting space of the melter enclosed by a floor portion and a top, the inlet wall comprising:
a glass contact wall supported on the floor portion, the glass contact wall comprising a glass contact surface facing the glass melting space and extending vertically away from the floor portion;
a jack arch positioned over at least a portion of the glass contact wall and at least a portion of the glass melting space, the jack arch comprising a front face facing the glass melting space and extending vertically away from the top towards the floor portion, a back face positioned opposite the front face, and an underside extending horizontally from the front face to the back face, wherein:
a plane of the front face of the jack arch and a plane of the glass contact surface are off-set from one another in a horizontal direction; and
a vertical distance from the floor portion to the underside of the jack arch is less than a vertical distance from the floor portion to an underside of the top.

2. The melter of claim 1, wherein a space between the plane of the front face of the jack arch and the plane of the glass contact surface includes a batch receiving volume bounded by at least the floor portion of the melter, the underside of the jack arch, the plane of the front face of the jack arch, and the plane of the glass contact surface.

3. The melter of claim 1, further comprising a plurality of burners, wherein the burners adjacent to the front face of the jack arch are at a level above the underside of the jack arch.

4. The melter of claim 1, wherein at least a portion of the glass contact surface is inclined away from the glass melting space of the melter with respect to a normal to the floor portion.

5. The melter of claim 4, wherein the glass contact wall comprises a base portion and an upper portion and the upper portion tapers from the base portion to a top of the glass contact wall.

6. The melter of claim 4, wherein the portion of the glass contact surface is inclined at an inclination angle from about 5 degrees to about 25 degrees with respect to the normal to the floor portion.

7. The melter of claim 1, wherein the glass contact wall is formed from zirconia refractory material.

8. The melter of claim 1, wherein the inlet wall comprises at least three batch inlet ports extending through the inlet wall.

9. The melter of claim 8, wherein the at least three batch inlet ports are equidistantly spaced from each other in a width direction of the inlet wall.

10. The melter of claim 1, wherein the jack arch is supported by brackets affixed to an exoskeleton of the melter and the brackets are displaceable and recoverable in a width direction of the inlet wall to accommodate expansion and contraction of the jack arch.

11. A melter for melting glass batch materials, the melter comprising:
an inlet wall, an outlet wall positioned opposite the inlet wall, and a pair of sidewalls extending from the inlet wall to the outlet wall, the inlet wall, the outlet wall, and the pair of sidewalls defining a glass melting space of the melter enclosed by a floor portion and a top, the inlet wall comprising:
a glass contact wall supported on the floor portion, the glass contact wall comprising a glass contact surface facing the glass melting space and extending vertically away from the floor portion;
a jack arch positioned over at least a portion of the glass contact wall and at least a portion of the glass melting space, the jack arch comprising a front face facing the glass melting space and extending vertically away from the top towards the floor portion, a back face positioned opposite the front face, and an underside extending horizontally from the front face to the back face, wherein:

- a plane of the front face of the jack arch and a plane of the glass contact surface are off-set from one another in a horizontal direction;
- a vertical distance from the floor portion to the underside of the jack arch is less than a vertical distance from the floor portion to an underside of the top;
- at least three batch inlet ports extend through the inlet wall; and
- a plurality of burners, wherein the burners adjacent to the front face of the jack arch are above the underside of the jack arch.

12. The melter of claim 11, wherein a space between the plane of the front face of the jack arch and the plane of the glass contact surface includes a batch receiving volume bounded by at least the floor portion of the melter, the underside of the jack arch, the plane of the front face of the jack arch, and the plane of the glass contact surface.

13. The melter of claim 11, wherein at least a portion of the glass contact surface is inclined away from the glass melting space of the melter with respect to a normal to the floor portion.

14. The melter of claim 13, wherein the glass contact wall comprises a base portion and an upper portion and the upper portion tapers from the base portion to a top of the glass contact wall.

15. The melter of claim 13, wherein the at least a portion of the glass contact surface is inclined at an inclination angle from about 5 degrees to about 25 degrees with respect to the normal to the floor portion.

16. The melter of claim 11, wherein the glass contact wall is formed from zirconia refractory material.

17. The melter of claim 11, wherein the at least three batch inlet ports are equidistantly spaced from each other in a width direction of the inlet wall.

18. The melter of claim 11, wherein the jack arch is supported by brackets affixed to an exoskeleton of the melter and the brackets are displaceable and recoverable in a width direction of the inlet wall to accommodate expansion and contraction of the jack arch.

* * * * *